United States Patent
Sambamurty et al.

(10) Patent No.: US 9,664,174 B2
(45) Date of Patent: May 30, 2017

(54) AERODYNAMIC ROOT ADAPTERS FOR WIND TURBINE ROTOR BLADES

(71) Applicant: General Electric Company, Schenectady, NY (US)

(72) Inventors: Saravakota Sambamurty, Bangalore (IN); Mohan Muthu Kumar Sivanantham, Bangalore (IN); Afroz Akhtar, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 820 days.

(21) Appl. No.: 14/087,289

(22) Filed: Nov. 22, 2013

(65) Prior Publication Data
US 2015/0147180 A1    May 28, 2015

(51) Int. Cl.
*F03D 1/06*    (2006.01)

(52) U.S. Cl.
CPC ......... *F03D 1/0658* (2013.01); *F03D 1/0675* (2013.01); *Y02E 10/721* (2013.01); *Y10T 29/49336* (2015.01)

(58) Field of Classification Search
CPC ..... F03D 1/0658; F03D 1/0675; Y02E 10/721
USPC .................................. 416/146 R, 204 R, 248
See application file for complete search history.

(56) References Cited

U.S. PATENT DOCUMENTS

| | | | |
|---|---|---|---|
| 6,783,326 B2* | 8/2004 | Weitkamp | F03D 7/0224 416/1 |
| 7,357,624 B2 | 4/2008 | Wobben | |
| 7,891,950 B2* | 2/2011 | Baker | F03D 1/0675 244/123.4 |
| 8,147,201 B2* | 4/2012 | Gray | F03B 17/061 416/204 A |
| 8,192,170 B2 | 6/2012 | Rohden | |
| 2007/0217918 A1* | 9/2007 | Baker | F03D 1/0675 416/227 R |
| 2009/0148291 A1* | 6/2009 | Gerber | F03D 1/0658 416/147 |
| 2010/0135797 A1* | 6/2010 | Nies | F03D 1/003 416/9 |
| 2013/0209264 A1 | 8/2013 | Mashue et al. | |

FOREIGN PATENT DOCUMENTS

WO        03060319 A1    7/2003

* cited by examiner

*Primary Examiner* — Ninh H Nguyen
*Assistant Examiner* — Aaron R Eastman
(74) *Attorney, Agent, or Firm* — GE Global Patent Operation; Ernest G. Cusick

(57) ABSTRACT

Aerodynamic root adapters for rotor blades include an interior support section having a first end that connects to a root end of the rotor blade and a second end that connects to a rotor hub of the wind turbine, and, an aerodynamic exterior section supported by the interior support section. The aerodynamic exterior section thereby extends an aerodynamic profile of the rotor blade beyond the root end of the rotor blade to at least partially between the root end of the rotor blade and the rotor hub when the aerodynamic root adapter is connected thereto.

13 Claims, 6 Drawing Sheets

AERODYNAMIC ROOT ADAPTERS FOR WIND TURBINE ROTOR BLADES

BACKGROUND OF THE INVENTION

The subject matter disclosed herein relates to wind turbine rotor blades and, more specifically, to aerodynamic root adapters for wind turbine rotor blades.

Wind power is considered one of the cleanest, most environmentally friendly energy sources presently available, and wind turbines have gained increased attention in this regard. A modern wind turbine typically includes a tower, generator, gearbox, nacelle, and one or more rotor blades connected to a hub either directly or through a pitch bearing. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades in general are increasing in size, in order to become capable of capturing increased kinetic energy. However, the shape of a typical wind turbine rotor blade results in a relatively large aerodynamic separation region, due to the contour of the rotor blade. Specifically, the contour of the inner portion of the rotor blade adjacent to and including the cylindrical root causes such separation. In some cases, this inner portion may include up to 40% or more of the rotor blade. The separation region causes relatively significant energy losses by creating drag. Further, these losses are amplified as rotor blade sizes are increased.

Add-on extensions or other structures have been suggested for improving the aerodynamic profile of the inner portion of the rotor blade. An issue, however, exists in effectively incorporating these structures at the cylindrical root portion of the blade without increasing the overall size and, thus, logistical costs and issues associated with transporting the blades to the wind turbine site.

Accordingly, alternative aerodynamic root adapters for wind turbine rotor blades would be welcome in the art.

BRIEF DESCRIPTION OF THE INVENTION

In one embodiment, an aerodynamic root adapter for a rotor blade of a wind turbine is disclosed. The aerodynamic root adapter includes an interior support section having a first end that connects to a root end of the rotor blade and a second end that connects to a rotor hub of the wind turbine, and, an aerodynamic exterior section supported by the interior support section, wherein the aerodynamic exterior section extends an aerodynamic profile of the rotor blade beyond the root end of the rotor blade to at least partially between the root end of the rotor blade and the rotor hub when the aerodynamic root adapter is connected thereto.

In another embodiment, a modified rotor blade assembly for a wind turbine is disclosed. The modified rotor blade assembly includes a rotor blade having a pressure side, a suction side, a leading edge, and a trailing edge extending in a generally span-wise direction between a tip end and a root end. The modified rotor blade further includes an aerodynamic root adapter attached to at least a portion of the root end of the rotor blade. The aerodynamic root adapter includes an interior support section having a first end that connects to the rotor blade and a second end that connects to a rotor hub of the wind turbine, and, an aerodynamic exterior section supported by the interior support section, wherein the aerodynamic exterior section extends an aerodynamic profile of the rotor blade beyond the root end of the rotor blade to at least partially between the root end of the rotor blade and the rotor hub.

In yet another embodiment, a method for extending an aerodynamic profile of a rotor blade for a wind turbine is disclosed. The method includes connecting a first end of an interior support section of an aerodynamic root adapter to a root end of the rotor blade, and, connecting an aerodynamic exterior section of the aerodynamic root adapter to the interior support section such that an aerodynamic profile of the rotor blade is extended beyond its root end.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
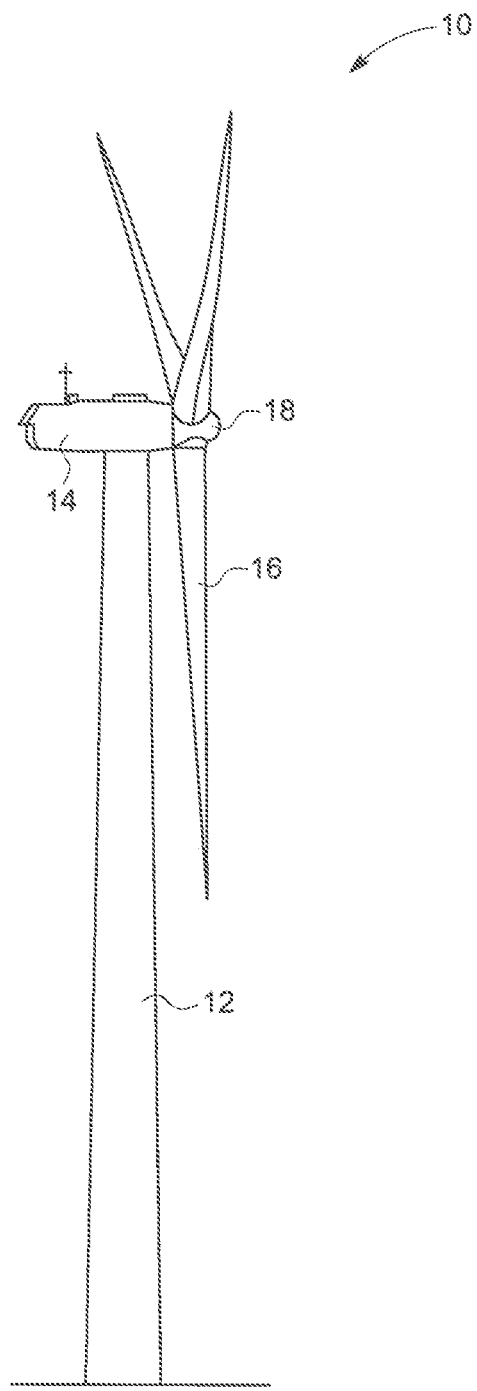
FIG. 1 is a perspective view of a conventional wind turbine having one or more rotor blades that may incorporate an aerodynamic root adapter according to one or more embodiments shown or described herein.

Referring now to FIG. 1 a wind turbine 10 of conventional construction is illustrated. The wind turbine 10 includes a tower 12 with a nacelle 14 mounted thereon. A plurality of rotor blades 16 are mounted to a rotor hub 18, which is in turn connected to a main flange that turns a main rotor shaft. Depending on the configuration of the wind turbine 10, the plurality of rotor blades 16 can, for example, be mounted to the rotor hub 18 indirectly through a pitch bearing (not illustrated) or any other operable connection technique. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration Referring now to FIG. 2, a perspective view of a rotor blade 16 is illustrated. The rotor blade 16 can include a root end 20 for mounting the rotor blade 16 to a mounting flange (not illustrated) of the wind turbine hub 18 (illustrated in FIG. 1) and a tip end 22 disposed opposite to the root end 20. The rotor blade 16 may comprise a pressure side 24 and a suction side 26 extending between a leading edge 28 and a trailing edge 30. In addition, the rotor blade 16 may include a span 32 defining the total length between the root end 20 and the tip end 22. The rotor blade 16 can further comprise a chord 34 defining the total length between the leading edge 28 and the trailing edge 30. It should be appreciated that the chord 34 may vary in length with respect to the span 32 as the rotor blade 16 extends from the root end 20 to the tip end 22.

The rotor blade 16 may define any suitable aerodynamic profile. Thus, in some embodiments, the rotor blade 16 may define an airfoil shaped cross-section. For example, the rotor blade 16 may also be aeroelastically tailored. Aeroelastic tailoring of the rotor blade 16 may entail bending the blade 16 in generally a chordwise direction x and/or in a generally spanwise direction z. As illustrated, the chordwise direction x generally corresponds to a direction parallel to the chord 34 defined between the leading edge 28 and the trailing edge 30 of the rotor blade 16. Additionally, the spanwise direction z generally corresponds to a direction parallel to the span 32 of the rotor blade 16. In some embodiments, aeroelastic tailoring of the rotor blade 16 may additionally or alternatively comprise twisting the rotor blade 16, such as by twisting the rotor blade 16 in generally the chordwise direction x and/or the spanwise direction z.

Figure 2:
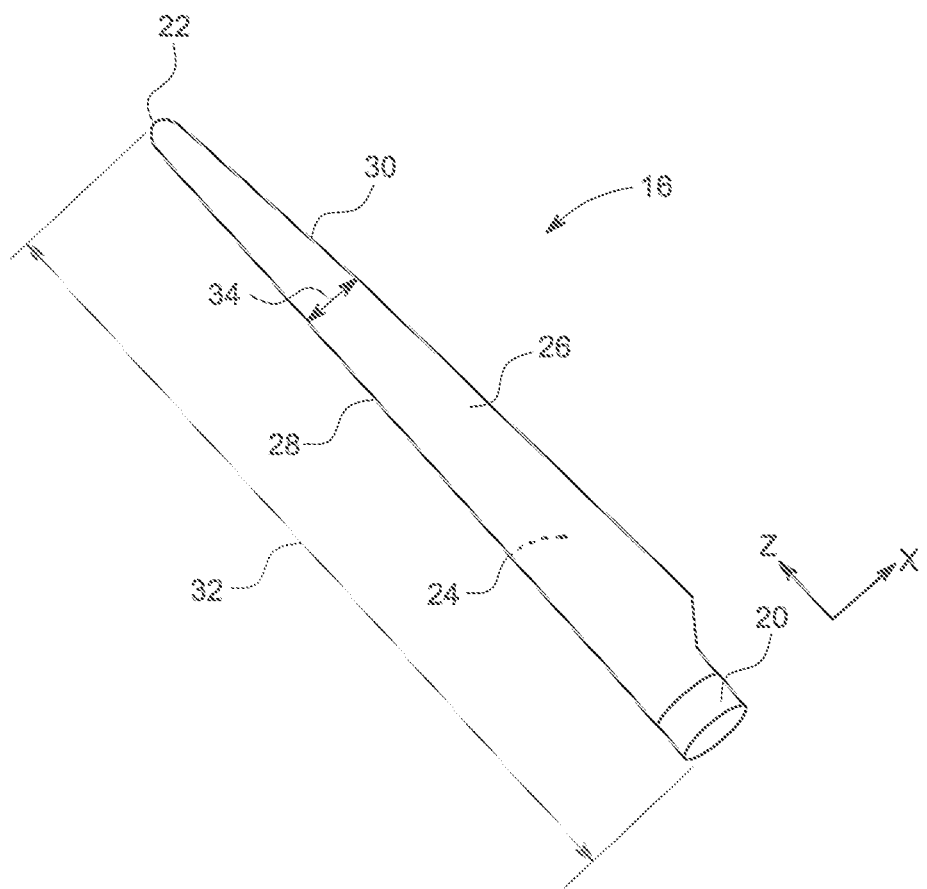
FIG. 2 is a perspective view of a rotor blade of the wind turbine illustrated in FIG. 1 according to one or more embodiments shown or described herein.
Figure 3:
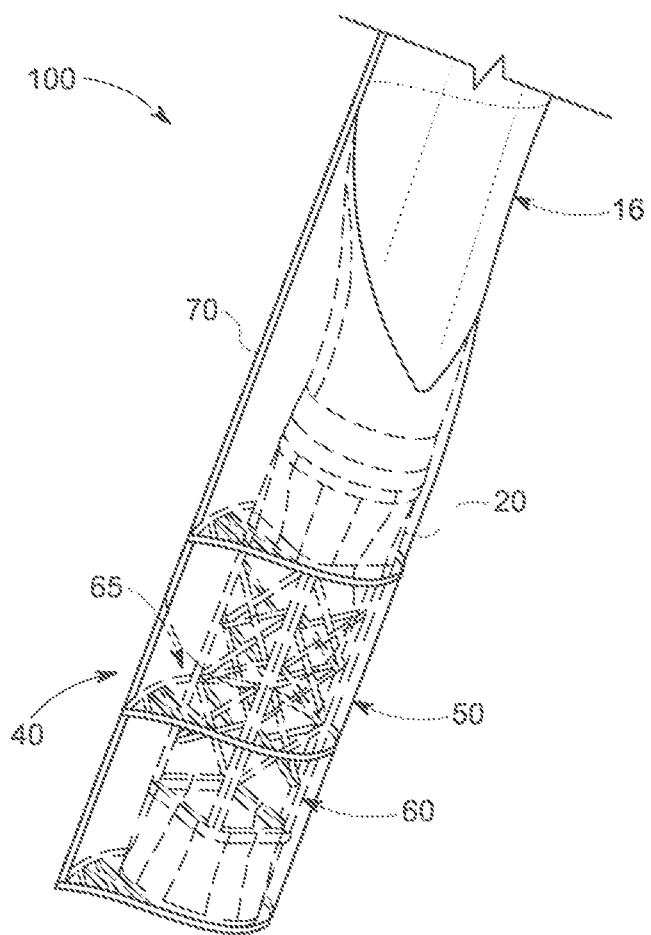
FIG. 3 is a perspective view of a section of a modified rotor blade assembly including an aerodynamic root adapter according to one or more embodiments shown or described herein.

Referring now to FIG. 3, a modified rotor blade assembly 100 is illustrated comprising the rotor blade 16 of FIG. 2 combined with an aerodynamic root adapter 40. The aerodynamic root adapter 40 generally extends the aerodynamic profile of the original rotor blade 16 past its root end 20 (i.e., towards the rotor hub 18) to provide a longer aerodynamic profile with a larger root diameter. The aerodynamic root adapter 40 generally comprises an interior support section 50 and an aerodynamic exterior section 70.

Figure 4:
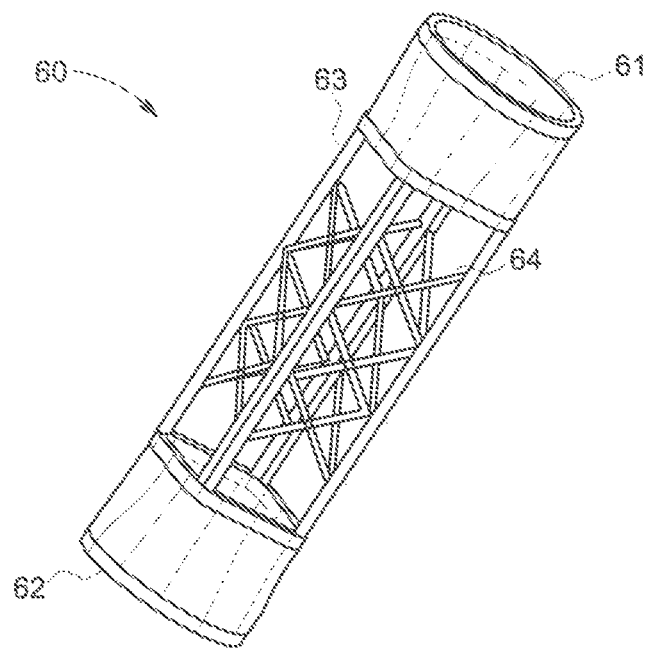
FIG. 4 is a perspective view of a central support of an interior support section of an aerodynamic root adapter according to one or more embodiments shown or described herein.
Figure 5:
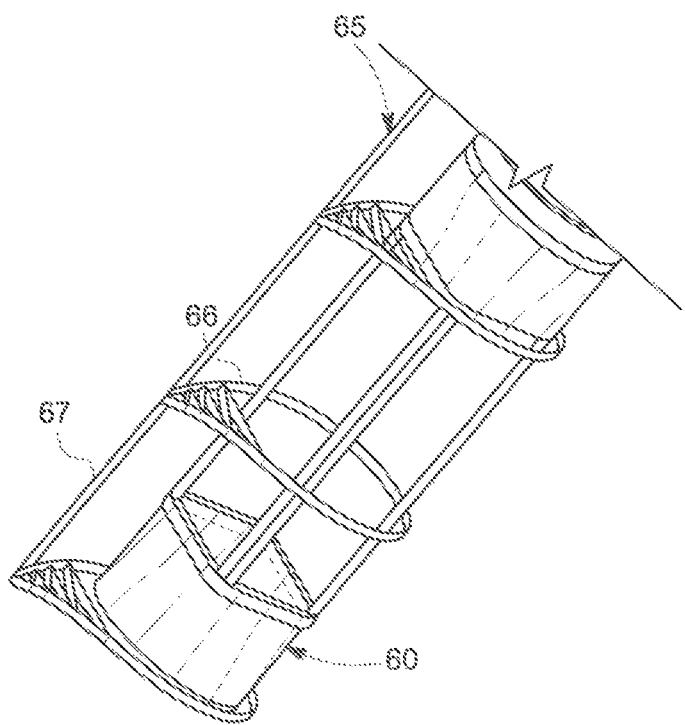
FIG. 5 is a perspective view of an aerodynamic support of an interior support section of an aerodynamic root adapter according to one or more embodiments shown or described herein.
Figure 6:
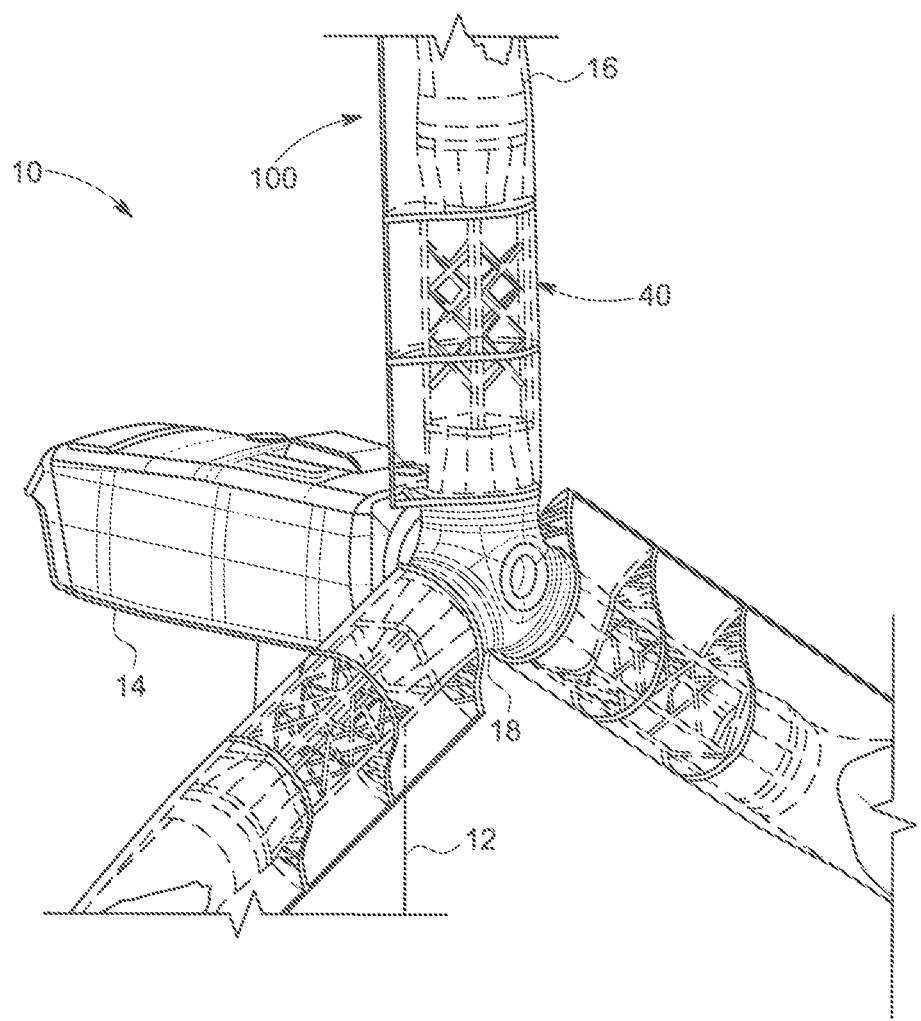
FIG. 6 is a perspective view of a section of a wind turbine incorporating modified rotor blade assemblies according to one or more embodiments shown or described herein.

The interior support section 50 provides structural support to the aerodynamic root adapter 40 and its aerodynamic exterior section 70. Referring to FIGS. 3, 4 and 6, the interior support section 50 can comprise a variety of configurations to facilitate the new connection between the hub 18 and the rotor blade 16 as well as provide structural support to the aerodynamic root adapter 40. For example, in some embodiments, such as that illustrated in FIGS. 4 and 5, the interior support section 50 may comprise a central support 60 and an aerodynamic support 65. The central support section 60 can comprise a first end 61 that connects to the root end 20 of the rotor blade 16 and a second end 62 that connects to the rotor hub 18 of the wind turbine 10. The central support section 60 can further comprise a variety of configurations to as should be appreciated herein. For example, in some embodiments, such as that illustrated in FIG. 4, the central support 60 may comprise one or more spanwise supports 63 and trusses 64. In other embodiments, the central support 60 may only comprise one or more spanwise supports 63.

The aerodynamic support 65 of the interior support section 50 may comprise a structure to support the aerodynamic exterior section 70 of the aerodynamic root adapter 40. For example, the aerodynamic support 65 can comprise one or more spanwise supports 67 and one or more cross-sectional ribs 66 that can assist in shaping the aerodynamic exterior section 70 into the aerodynamic profile. For example, when the aerodynamic exterior section 70 comprises a fabric material, the one or more cross-sectional ribs 66 can shape the fabric material into an aerodynamic profile when it is brought into tension (i.e., a tension fabric design).

Still referring to FIG. 3, the aerodynamic root adapter 40 further comprises the aerodynamic exterior section 70. The aerodynamic exterior section 70 is supported by the interior support section (such as through an aerodynamic support 65 when present). The aerodynamic exterior section 70 can comprise any material or materials that form a contoured aerodynamic profile around the interior support section 50. The aerodynamic exterior section 70 can thereby extend the aerodynamic profile of a rotor blade 16 beyond its root end 20 when connected thereto.

The aerodynamic exterior section 70 can comprise any material or materials suitable for an exterior of a rotor blade 16. For example, the aerodynamic exterior section 70 can comprise fabric, fiber composites or the like. In some embodiments, the aerodynamic exterior section 70 comprises the same material as the shell of the original rotor blade 16 that the aerodynamic root adapter 40 is being connected to. Furthermore, the aerodynamic exterior section 70 can have any contoured profile that is aerodynamic to facilitate the capturing of incoming wind energy. For example, the aerodynamic exterior section 70 can comprise the same aerodynamic profile as the original rotor blade 16 so that it becomes a continuous extension thereto.

Referring now additionally to FIG. 6, the aerodynamic root adapter 40 can be attached to at least a portion of the root end 20 of a rotor blade 16 to form a modified rotor blade assembly 100. Specifically, the first end 61 of the interior support section 50 can connect to the root end 20 of the rotor blade 16 through any suitable connection. For example, the first end 61 of the interior support section 50 may be bolted, clamped, glued or the like to the root end 20 of the rotor blade 16. The aerodynamic exterior section 70 thereby extends the aerodynamic profile of the rotor blade 16 beyond its original root end 20 towards the rotor hub 18. When the original rotor blade contained a tapered portion that the trailing edge 30 recesses inwards at the root end 20, the aerodynamic root adapter 40 will replace that recess with an aerodynamic profile to allow for the capture of additional wind at that location. Moreover, in some embodiments, the aerodynamic profile can extend past the root end 20 of the original rotor blade 16. In even some embodiments, the aerodynamic profile facilitated by the aerodynamic root adapter can extend for the entire length of the modified rotor blade assembly 100.

In some embodiments, the aerodynamic exterior section 70 may be connected to the shell of the original rotor blade 16 such that it forms a continuous outer surface. Such a connection may be facilitated through epoxy, composites, fabrics or any other suitable material(s) or combinations thereof.

The modified rotor blade assembly 100 may further be connected to the rotor hub 18 of a wind turbine 10 through any suitable connection. For example, the second end of the interior support section 50 of the aerodynamic root adapter 40 may be connected to the rotor hub through a pitch bearing (not illustrated) using bolts, pins, clamps or the like. In some embodiments, the second end of the interior support section 50 is connected to the rotor hub 18 via the same mechanism that was utilized to connect the root end 20 of the original rotor blade 16.

Figure 7:
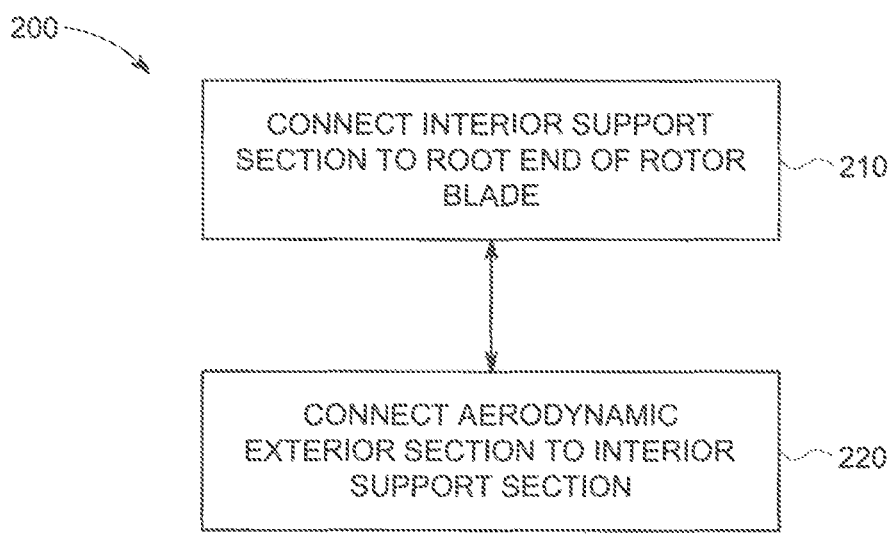
FIG. 7 illustrates a method for extending an aerodynamic profile of a rotor blade according to one or more embodiments shown or described herein.

Referring now additional to FIG. 7, a method 200 is illustrated for extending an aerodynamic profile of a rotor blade 16 for a wind turbine 10. The method 200 generally comprises in step 210 connecting a first end 61 of an interior support section 50 of an aerodynamic root adapter 40 to a root end 20 of the rotor blade 16. The connection can be facilitated through any suitable means as discussed above. The method further comprises in step 220 connecting an aerodynamic exterior section 70 of the aerodynamic root adapter 40 to the interior support section 50 such that an aerodynamic profile of the rotor blade 16 is extended beyond its root end 20.

In some embodiments, the interior support section 50 may be connected to the rotor blade 16 in step 210 before the aerodynamic exterior section 70 is connected to the interior support section 50 of the aerodynamic root adapter 40 in step 220. However, in other embodiments, the aerodynamic exterior section 70 may be connected to the interior support section 50 in step 220 prior to connecting the interior support section 50 to the rotor blade 16 in step 210. In such embodiments, the aerodynamic root adapter 40 may be fully assembled before it is connected to the rotor blade 16.

In some embodiments, the interior support section 50 may itself be formed by connecting an aerodynamic support 65 to a central support 60. In such embodiments, the aerodynamic exterior section 70 may thereby be connected by attaching it to the aerodynamic support 65 of the interior support section. For example, a fabric material may be wrapped and fixed to the aerodynamic support 65 to form an aerodynamic profile.

In some embodiments, the method 200 further comprises connecting a second end of the interior support section 50 to a rotor hub 18 of the wind turbine 16. In such embodiments, the connection between the interior support section 50 and the rotor hub 18 may occur in any relative order with respect to the connections made in steps 210 and 220.

It should now be appreciated that the aerodynamic root adapter may modify a rotor blade to extend its aerodynamic profile over and past its root end. Such modification can allow for greater annual energy production, particularly in low wind environments, by increasing the amount of wind captured with respect to the original rotor blade. The installation of such aerodynamic root adapters may be utilized with new make or previously field-deployed rotor blades to extend the rotor blade diameter. Such modifications can also facilitate shipping and/or can enable the additional capture of wind energy.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aerodynamic root adapter for a rotor blade of a wind turbine, the aerodynamic root adapter comprising:
    an interior support section having a first end that connects to a root end of the rotor blade and a second end that connects to a rotor hub of the wind turbine; and,
    an aerodynamic exterior section supported by the interior support section, wherein the aerodynamic exterior section extends an aerodynamic profile of the rotor blade beyond the root end of the rotor blade to at least partially between the root end of the rotor blade and the rotor hub when the aerodynamic root adapter is connected thereto,
    wherein the rotor blade has an aerodynamic profile that tapers off at the root end that is internal to the aerodynamic profile of the aerodynamic exterior section of the aerodynamic root adapter.

2. The aerodynamic root adapter of claim 1, wherein the interior support section comprises a central support that connects to the rotor blade and the rotor hub, and an aerodynamic support connected to the central support that supports the aerodynamic exterior section.

3. The aerodynamic root adapter of claim 2, wherein the aerodynamic support defines the aerodynamic profile of the aerodynamic exterior section.

4. The aerodynamic root adapter of claim 2, wherein the central support comprises trusses connected to one or more spanwise supports.

5. The aerodynamic root adapter of claim 1, wherein the aerodynamic exterior section comprises a tension fabric.

6. The aerodynamic root adapter of claim 1, wherein the aerodynamic exterior section comprises a fiber composite shell.

7. The aerodynamic root adapter of claim 1, wherein the aerodynamic profile extends an entire length of the aerodynamic root adapter.

8. The aerodynamic root adapter of claim 1, wherein the aerodynamic exterior section forms a continuous outer surface with the rotor blade.

9. A modified rotor blade assembly for a wind turbine, the modified rotor blade assembly comprising:
    a rotor blade having a pressure side, a suction side, a leading edge, and a trailing edge extending in a generally span-wise direction between a tip end and a root end;
    an aerodynamic root adapter attached to at least a portion of the root end of the rotor blade, the aerodynamic root adapter comprising:
        an interior support section having a first end that connects to the rotor blade and a second end that connects to a rotor hub of the wind turbine; and, an aerodynamic exterior section supported by the interior support section, wherein the aerodynamic exterior section extends an aerodynamic profile of the rotor blade beyond the root end of the rotor blade to at least partially between the root end of the rotor blade and the rotor hub,
wherein the rotor blade has an aerodynamic profile that tapers off at the root end that is internal to the aerodynamic profile of the aerodynamic exterior section of the aerodynamic root adapter.

10. The modified rotor blade assembly of claim 9, wherein the interior support section comprises a central support that connects to the rotor blade and the rotor hub, and an aerodynamic support connected to the central support that supports the aerodynamic exterior section.

11. The modified rotor blade assembly of claim 9, wherein the aerodynamic profile extends an entire length of the aerodynamic root adapter.

12. The modified rotor blade assembly of claim 9, wherein the aerodynamic exterior section forms a continuous outer surface with the rotor blade.

13. The modified rotor blade assembly of claim 9, wherein the aerodynamic exterior section comprises the same material as a shell of the rotor blade.

* * * * *